(12) United States Patent
Müller et al.

(10) Patent No.: US 12,545,280 B2
(45) Date of Patent: Feb. 10, 2026

(54) METHOD FOR MONITORING A VEHICLE (71) Applicant: ZF Friedrichshafen AG, Friedrichshafen (DE)

(72) Inventors: Christoph Müller, Osnabrück (DE); Stefan Schmidt, Osnabrück (DE)

(73) Assignee: ZF Friedrichshafen AG, Friedrichshafen (DE)

(*) Notice: Subject to any disclaimer, the term of this patent is extended or adjusted under 35 U.S.C. 154(b) by 56 days.

(21) Appl. No.: 18/548,958

(22) PCT Filed: Dec. 9, 2021

(86) PCT No.: PCT/EP2021/084998
§ 371 (c)(1),
(2) Date: Sep. 5, 2023

(87) PCT Pub. No.: WO2022/184303
PCT Pub. Date: Sep. 9, 2022

(65) Prior Publication Data
US 2024/0149905 A1 May 9, 2024

(30) Foreign Application Priority Data
Mar. 5, 2021 (DE) .................. 10 2021 202 168.9

(51) Int. Cl.
*B60W 50/16* (2020.01)
*B60G 17/0185* (2006.01)

(52) U.S. Cl.
CPC ......... *B60W 50/16* (2013.01); *B60G 17/0185* (2013.01); *B60G 2600/042* (2013.01); *B60G 2600/044* (2013.01)

(58) Field of Classification Search
CPC ............... B60W 50/16; B60G 17/0185; B60G 2600/042; B60G 2600/044
See application file for complete search history.

(56) References Cited

U.S. PATENT DOCUMENTS 8,248,270 B2 * 8/2012 Nieves ............... B60Q 9/00
340/936
10,762,786 B1 * 9/2020 Dewey ............... G05D 1/0055
(Continued)

FOREIGN PATENT DOCUMENTS

DE   10 2004 036 475 A1   3/2006
DE   10 2013 016 040 A1   4/2014
(Continued)

OTHER PUBLICATIONS

European Patent Office, International Search Report issued in International patent application No. PCT/EP2021/084998 (Apr. 4, 2022).
(Continued)

*Primary Examiner* — Mohamed Barakat
(74) *Attorney, Agent, or Firm* — Finch & Maloney PLLC (57) ABSTRACT

A method for monitoring a vehicle (1) having a vehicle superstructure (2), a chassis (3) connected to the vehicle superstructure (2), and a monitoring unit (11) which monitors the chassis (3) for damage. In the event that chassis damage is detected, the monitoring unit produces a warning signal (S) by means of a warning signal generator, where the warning signal generator has at least one drive unit (10) by means of which the warning signal (S) is produced in the form of a tactile mechanical vibration.

13 Claims, 3 Drawing Sheets

(56) References Cited

U.S. PATENT DOCUMENTS

| | | | |
|---|---|---|---|
| 11,124,199 B2 | 9/2021 | Cui et al. | |
| 2004/0252020 A1* | 12/2004 | Matsumoto | B60W 50/16 340/441 |
| 2015/0353098 A1* | 12/2015 | Percy | B60W 50/16 701/53 |
| 2017/0136842 A1* | 5/2017 | Anderson | B60G 99/002 |
| 2018/0170229 A1* | 6/2018 | Hashimoto | B60W 50/14 |
| 2018/0339652 A1* | 11/2018 | Prescott | B60Q 5/005 |
| 2019/0108692 A1* | 4/2019 | Du | B60W 50/14 |
| 2022/0212691 A1* | 7/2022 | Mackenzie | B60L 53/36 |
| 2023/0061412 A1* | 3/2023 | Joo | B60W 50/16 |

FOREIGN PATENT DOCUMENTS

| | | |
|---|---|---|
| DE | 10 2015 204 043.7 A1 | 9/2016 |
| DE | 102015204043 A1 * | 9/2016 |
| DE | 102018215606 A1 * | 2/2020 |
| DE | 10 2018 217 403 A1 | 4/2020 |
| DE | 10 2020 000 206 A1 | 10/2020 |

OTHER PUBLICATIONS

European Patent Office, Written Opinion issued in International patent application No. PCT/EP2021/084998 (Apr. 4, 2022).

German Patent Office, Office Action issued in German patent application No. 10 2021 202 168.9 (Oct. 15, 2021).

\* cited by examiner

METHOD FOR MONITORING A VEHICLE

RELATED APPLICATIONS

This application claims the benefit under 35 U.S.C. § 371 as a U.S. National Phase Application of application no. PCT/EP2021/084998, filed on 9 Dec. 2021, which claims benefit of German Patent Application no. 10 2021 202 168.9 filed on 5 Mar. 2021, the contents of which are hereby incorporated herein by reference in their entireties.

FIELD OF THE DISCLOSURE

The invention relates to a method for monitoring a vehicle, which vehicle comprises a vehicle superstructure, a chassis connected to the superstructure, and a monitoring unit that monitors the chassis for damage, and in the event that chassis damage is detected, emits a warning signal by means of a warning signal generator.

BACKGROUND

In a vehicle, numerous active chassis components can undergo accelerations and/or movement speeds, such as rotor position sensors and/or torque sensors in an electro-mechanical roll-stabilization system, a force and/or rotor position sensor in an electronic steering system, height-level sensors, etc. In cases of failure and/or defects, it is typical for characteristic, in particular uniform, vibration patterns and/or characteristic oscillations to occur, which can be recognized by the already present sensor systems. Thereafter, the damage is categorized by an evaluation, for example, determined by carrying out a Fast-Fourier Transformation (FFT) or an order analysis, which depends on the wheel rotation speed or some other suitable rotation speed. A suitable rotation speed can, for example, be a motor rotation speed of a chassis actuator. Depending on the severity of the chassis damage recognized, various warnings can be emitted to the driver, and which can be communicated to the driver in various ways. For example, it is known to issue a warning message to the driver in the form of a pictogram and/or an acoustic warning signal. However, such warning messages are often ignored by the driver.

SUMMARY

The particular purpose of the present invention is to make it more difficult for the driver to ignore a warning message caused by damage to the chassis.

This objective is achieved by a method for monitoring a vehicle as variously disclosed herein. Preferred further developments of the method are indicated in the claims and in the description that follows.

A method for monitoring a vehicle which comprises a vehicle superstructure, a chassis connected to the superstructure and a monitoring unit, which monitors the chassis for damage and if damage to the chassis is detected, generates a warning signal by means of a warning signal generator, is developed further according to the invention, in particular in that the warning signal generator comprises at least one drive by means of which the warning signal is produced, in particular in the form of a tactile mechanical vibration, preferably in such manner that the warning signal and/or vibration is or can be conveyed, in particular to a driver of the vehicle as a tactile stimulus. A driver is specifically understood to be an operator of the vehicle.

Thus, the warning signal is communicated to the driver of the vehicle, in particular as a tactile stimulus. However, as a rule, the driver can ignore a tactile stimulus less easily than, for example, a visual stimulus in the form of a pictogram. Preferably, the warning signal is or can be communicated to the driver of the vehicle in the form of a tactile stimulus. Preferably, the warning signal and/or the, in particular tactile mechanical vibration is or preferably constitutes a vibration alarm.

The vehicle is, in particular, a motor vehicle, preferably a motor car such as a passenger car. Expressions such as "at least one" or "the at least one" include in particular the sense of "one" and/or "exactly one".

The drive is in particular an electro-mechanical drive unit. For example, the drive comprises at least one actor and/or the drive is, for example, formed by at least one actor. Preferably, the drive is or will be controllable or controlled by the monitoring unit, preferably in such manner that the warning signal is or can be produced.

According to a further development, the warning signal is transmitted, in particular directly or indirectly, into the chassis and/or into the superstructure of the vehicle by means of the warning signal generator and/or by means of the drive. Since, as a rule, the driver is in contact with the superstructure of the vehicle, for example, in a passenger compartment and/or on a driver's seat, the warning signal can in that way be easily perceived by the driver. In particular, the driver is in contact with at least part of the superstructure of the vehicle. If the warning signal is produced in the chassis, then as a rule it will be passed on into the superstructure of the vehicle by way of bearings and/or control arms, particularly in damped form.

In one design the chassis comprises at least one active chassis component, which forms the warning signal generator. Thus, in particular it is possible to have recourse to components already present in the vehicle as the warning signal generator. For example, the at least one active chassis component comprises or forms an active damper, and/or an active wheel suspension, and/or an active rear-axle steering system, and/or an active roll-stabilization system which, in particular, is an electro-mechanical roll-stabilization system.

In a further development, the vehicle comprises at least one active system that forms the warning signal generator. Thus, in particular, it is possible to have recourse to systems already present in the vehicle as the warning signal generator. For example, the at least one active system comprises or is in the form of a steer-by-wire system, and/or a brake-by-wire system, and/or a throttle-by-wire system, and/or a drive-by-wire system.

Preferably the vehicle comprises at least one active damper, in particular which forms the warning signal generator, and at least one damper drive that forms the drive unit by means of which, to produce the warning signal, for example, the length of the damper can be or is varied. The warning signal is or can be transmitted, in particular directly or indirectly, preferably into the vehicle superstructure and/or into the chassis, preferably by means of the damper and/or the damper drive. Advantageously, the damper is provided in the chassis and/or between the chassis and the superstructure of the vehicle. In particular the length of the damper can be varied, preferably by means of the damper drive. For example, in that way the distance between the chassis and the superstructure of the vehicle can be varied. Preferably, by means of the damper drive, the mechanical vibration can be or is produced in the form of length variations of the damper. Preferably, the damper is integrated into an active wheel suspension. In particular, the damper is part of an active wheel suspension.

According to one design, the vehicle comprises at least one active roll-stabilizer, in particular which forms the warning signal generator, and at least one stabilizer drive that forms the drive unit, by means of which, to produce the warning signal, for example, two ends of the roll-stabilizer, also called stabilizer ends, can be and/or are rotated relative to one another and/or against one another, in particular about a stabilizer axis preferably extending in the transverse direction of the vehicle. Preferably by means of the roll-stabilizer and/or the stabilizer drive, the warning signal is, in particular, transmitted directly or indirectly, preferably into the vehicle superstructure and/or into the chassis. Advantageously, the roll-stabilizer is provided in the chassis and/or between the chassis and the superstructure of the vehicle. In particular the roll-stabilizer is connected between the vehicle wheels or wheel suspensions of a vehicle axle of the vehicle. Advantageously, each stabilizer end is connected to one of the vehicle wheels or wheel suspensions of the vehicle axle, or of vehicle axles, of the vehicle. For example, the roll-stabilizer is mounted between its stabilizer ends on the superstructure of the vehicle. In particular the roll-stabilizer extends along the stabilizer axis, or a stabilizer axes. Advantageously, the roll-stabilizer is rod-shaped. For example, by means of the stabilizer drive and/or the roll-stabilizer the mechanical vibration is or can be produced in the form of rolling movements of the superstructure of the vehicle. Preferably, the roll-stabilizer is integrated in an active roll-stabilization system and/or in an active wheel suspension system. In particular the roll-stabilizer is part of an active roll-stabilization system and/or an active wheel suspension system.

In a further development the vehicle comprises at least one, in particular active rear-axle steering system that forms the warning signal generator, and at least one rear-axle steering system drive that forms the drive unit by means of which, to produce the warning signal, preferably by way of a track rod, for example the tracking and/or a track angle of at least one vehicle wheel on a rear axle of the vehicle can be or is adjusted. Preferably by means of the rear-axle steering system and/or the drive of the rear-axle steering system, the warning signal preferably is or can be transmitted in particular into the vehicle superstructure and/or the chassis. Advantageously, the rear-axle steering system is provided in the chassis and/or between the chassis and the superstructure of the vehicle. Preferably, the rear-axle steering system is integrated in an active wheel suspension system. In particular, the rear-axle steering system is part of an active wheel suspension system.

According to one design, the vehicle comprises an active steering device equipped with a steering wheel, which forms the warning signal generator, and which comprises at least one steering-wheel drive that forms the drive unit, by means of which the warning signal is or can, for example, be transmitted to the steering-wheel, in particular directly or indirectly. The steering-wheel can, in particular, be turned about a steering-wheel axis, preferably by means of the steering-wheel drive. Preferably, by means of the steering-wheel drive, the mechanical vibration is or can be produced by the steering-wheel drive in the form of rotation movements of the steering-wheel about the steering-wheel axis. Preferably, the steering device is an electronic steering device and/or, for example, in the form of a steer-by-wire system. The steering-wheel drive comprises in particular at least one actor, which, for example, can also be called the steering-wheel actor.

In a further development, the vehicle comprises, in particular, at least one active foot-pedal arrangement equipped with a foot-pedal, which forms the at least one warning signal generator and which comprises at least one foot-pedal drive that forms the drive unit by means of which, in particular directly or indirectly, the warning signal is or can be transmitted, for example, to the foot-pedal. In particular, the foot-pedal can be pivoted about a foot-pedal pivoting axis, preferably by means of the foot-pedal drive. Preferably, by means of the foot-pedal drive, the mechanical vibration is or can be produced in the form of pivoting movements of the foot-pedal about the foot-pedal pivoting axis. The foot-pedal is, for example, in the form of a brake pedal or an accelerator pedal. Preferably, the foot-pedal arrangement is an electronic foot-pedal arrangement and/or is, for example, in the form of a brake-by-wire system or a throttle-by-wire system or a drive-by-wire system. In particular, the foot-pedal drive comprises at least one actor which, for example, can also be called the foot-pedal actor.

In one design, the vehicle comprises an active brake system equipped, in particular, with at least one brake, which forms the warning signal generator and comprises at least one brake drive that forms the drive unit, by means of which the at least one brake is or can be actuated, for example, as a function of the warning signal. Preferably, by means of the brake drive, the mechanical vibration is or can be produced in the form of intermittent and/or periodic braked decelerations of the vehicle. In particular, by means of the brake system, the vehicle, and/or at least one vehicle wheel of the vehicle, is slowed down, and/or braked, and/or can be slowed down and/or braked. Preferably, the brake system is an electronic brake system and/or is in the form of a brake-by-wire system. The brake drive comprises in particular at least one actor, which can for example be called the brake actor.

According to a further development, the vehicle comprises a vehicle drive, which forms the at least one warning signal generator and comprises at least one vehicle motor which constitutes the drive unit which, for example, as a function of the warning signal, is controlled and/or accelerated or can be controlled and/or accelerated. Preferably, by means of the vehicle motor the mechanical vibration is or can be produced in the form of intermittent and/or periodic accelerations of the vehicle. Preferably, the vehicle drive comprises an electronic control system and/or is, for example, integrated in a throttle-by-wire system or in a drive-by-wire system.

In particular the warning signal is strong enough to be perceptible or perceived by the driver as a tactile stimulus. Preferably, however, the warning signal is also weak enough not to compromise the driving behavior of the vehicle, and/or the behavior of the at least one active chassis component, and/or the behavior of the at least one active system, and/or that of the driver.

Preferably one or more sensors are provided, by means of which, in particular, the monitoring unit of the chassis monitors the chassis for damage or damages. The sensor or sensors include, for example, one or more acceleration sensors, and/or one or more acoustic sensors, and/or one or more angular position indicators or rotor position sensors, and/or one or more torque sensors, and/or one or more inertial measurement units. Preferably, at least one of the at least one active chassis component of the chassis and/or at least one or the at least one active system of the vehicle comprises the sensor or sensors or at least one or some of the sensors. Thus, to monitor the chassis, components already present in the vehicle can be used. The at least one active chassis component mentioned in connection with the sensor or sensors comprises or forms, for example, the active damper or an active damper, and/or the wheel suspension or an active wheel suspension, and/or the rear-axle steering system or an active rear-axle steering system, and/or the active roll-stabilization system or an active roll-stabilization system, which is, in particular, the electro-mechanical roll-stabilization system or an electro-mechanical roll-stabilization system. The at least one active system mentioned in connection with the sensor or sensors comprises or is in the form of, for example, the steer-by-wire system or a steer-by-wire system, and/or the brake-by-wire system or a brake-by-wire system, and/or the throttle-by-wire system or a throttle-by-wire system, and/or the drive-by-wire system or a drive-by-wire system.

Owing to the chassis damage or any chassis damage, in particular, characteristic vibrations are produced in the chassis. Preferably, in particular, to monitor the chassis for any damage, by means of the monitoring unit, vibrations occurring in the chassis are detected and/or monitored. Preferably, the characteristic vibrations or any characteristic vibrations are detected and/or identified by means of the monitoring unit. Advantageously, the damage or any damage in the chassis is pinpointed by the monitoring unit, for example, by triangulation or, in particular, by some other location method. Thus, for example, the chassis damage can be attributed to a particular chassis component. Location or triangulation can be carried out, for example, with the help of a number of acceleration sensors and/or a number of acoustic sensors. The vibration or vibrations are preferably mechanical vibrations.

In particular, different types of chassis damage produce different characteristic vibrations in the chassis. Preferably, for various types of chassis damage, different vibration patterns are lodged and/or stored in the monitoring unit. The different vibration patterns characterize, in particular, different characteristic vibrations or the different characteristic vibrations. Preferably, for identifying the chassis damage, vibrations or the vibrations occurring in the chassis, are compared by the monitoring unit with the vibration patterns. In particular, the vibration patterns are or will be predetermined.

According to one design, in particular, therefore, a characteristic vibration type is produced in the chassis by the chassis damage, which vibration type is detected and/or identified and/or associated with one of the vibration patters.

In a further development, a signal corresponding to the characteristic vibrations is generated as the warning signal. For example, the warning signal is used to reinforce and/or pass on the characteristic vibrations.

Preferably, for different types of chassis damage, different warning signals are or can be produced by the monitoring unit. According to a first alternative or option, the warning signal comprises, for example, a number of consecutive vibration impulses, which are preferably interrupted and/or separated from one another by signal pauses during which, in particular, the warning signal does not produce any vibration impulse. By virtue of the length of the vibration impulses, and/or by virtue of the length of the signal pauses, and/or by virtue of the generation cycle, different variants of the warning signal can be produced. According to a second alternative or option, the warning signal contains, for example, a continuous vibration impulse. Thus, the second alternative or option corresponds to the first alternative or option without signal pauses, or with a signal pause of zero. For different warning signals, the frequency of the mechanical vibration can also be different.

Preferably, the mechanical vibration of the warning signal is or can be produced on the basis of a vibration pattern. Preferably, for different types of chassis damage, different vibration patterns are logged and/or stored in the monitoring unit. Advantageously, specifically in the monitoring unit each of the various oscillation patterns is associated with one of the various vibration patterns. Preferably, particularly after the damage has been identified, the mechanical vibration of the warning signal is or can be produced on the basis of the associated vibration pattern. The vibration patterns are, in particular, predetermined.

In an embodiment, in particular additionally, an acoustic and/or visual warning message is or can be generated by the monitoring unit. Thus, for example, supplementary warning information can be given to the driver. For example, when chassis damage has been detected, an acoustic and/or visual warning message is first produced by means of the monitoring unit, which is followed by the warning signal later or after a delay. The visual warning message takes, for example, the form of a light signal and/or a pictogram. The acoustic warning message takes, for example, the form of an acoustic signal or tone.

In addition or alternatively to a visual warning message (for example in the form of a pictogram) and/or an acoustic warning message (for example in the form of a warning tone), according to an embodiment of the invention, the warning signal is generated by regulating and/or controlling at least one active chassis component of the vehicle (such as an active damper and/or an active wheel suspension and/or AKC and/or ERC) and/or at least one active system of the vehicle (such as steer-by-wire and/or brake-by-wire and/or throttle-by-wire). Preferably, particularly in that way a vibration characteristic of a chassis, damage type can be superimposed and/or reinforced on a normal chassis movement, preferably in order to alert the driver. In addition, or alternatively, the warning signal can, for example, be produced, in particular, by short accelerator and/or brake control impulses.

Preferably, a categorization of characteristic vibrations is possible, for example by methods of Artificial Intelligence (AI), in order to produce different vibration patterns for different chassis damage types. Some examples of different vibration patterns for different chassis damage types are given below, in the form "Chassis damage→Vibration pattern":

Wheel-bearing damage→short vibration impulses every 10 seconds;
Worn-out rubber mounting→short vibration impulses every 2 seconds;
Loose wheel-nut→continuous vibration impulse.

Furthermore, it is possible to allow the various vibration patterns for the different chassis damage types to be specified freely by the driver or a driver. For that purpose, in particular, the vehicle and/or the monitoring unit comprises an input device.

It is also possible, in the event of damage to the chassis, first to emit a visual and/or acoustic warning message and later, for example, if the said warning message is ignored by the driver, to generate the warning signal.

An example of chassis damage is the loss of wheel balance in a vehicle wheel. For example, in the case of a steer-by-wire system as the active system, there is no direct mechanical coupling of the steered vehicle wheels to the steering-wheel. The influence of the chassis on the steering is, in particular, indicated by a steering-wheel actor which, for example, introduces forces and/or torques into the steering-wheel only in a restricted, predetermined frequency range and therefore also conveys to the driver only limited information about the actual forces and/or torques acting upon the steering. If a wheel balance loss takes place, this is perceived by the driver as vibrations whose frequency depends on the speed of the vehicle. Since that frequency may also be outside the predetermined frequency range, it makes sense for the monitoring unit to be able to detect vibrations even outside the predetermined frequency range in the chassis and/or to be able to produce a warning signal even for vibrations with frequencies outside the predetermined frequency range.

In addition, in the event of chassis damage there can also be active intervention in the driving of the vehicle, for example in order to delay any degradation of the failed components that have caused the chassis damage by virtue of speed variations and/or center-of-gravity adaptations.

Moreover, it is also possible to pinpoint the chassis damage, for example, by triangulation, and to reinforce the vibration characterizing the chassis damage concerned in the warning signal in order to encourage the driver to go to a workshop.

BRIEF DESCRIPTION OF THE DRAWINGS

Below, the invention will be described in relation to a preferred embodiment, with reference to the drawing, which shows.

DETAILED DESCRIPTION

Figure 1:
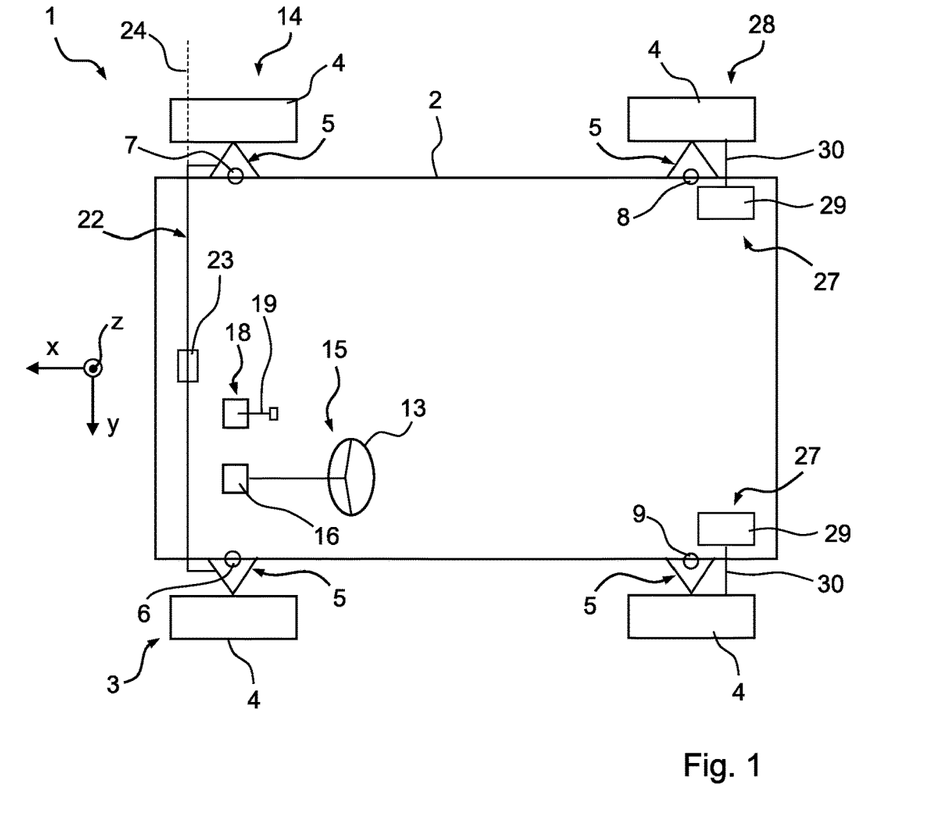
FIG. 1: A schematic view of a vehicle.

FIG. 1 shows a schematic view of a vehicle 1 with a vehicle superstructure 2 and a chassis 3 connected thereto, which chassis comprises vehicle wheels 4 and wheel suspensions 5 by means of which the vehicle wheels 4 are connected to the vehicle superstructure 2. In addition, each wheel suspension 5 of the chassis 3 comprises an active damper, the said active dampers 6, 7, 8, and 9 being connected between the wheel suspension 5 concerned and the vehicle superstructure 2. For completeness, a longitudinal direction x of the vehicle, a transverse direction y, and a vertical direction z are also represented.

Figure 2:
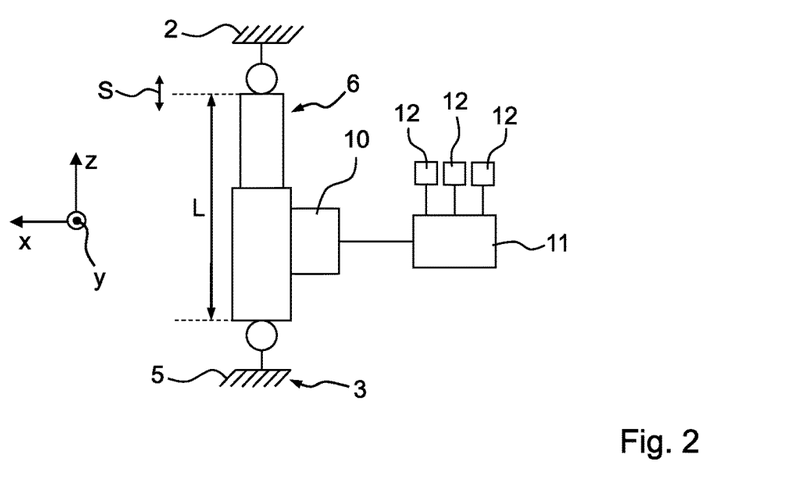
FIG. 2: A schematic view of an active damper of the vehicle, in accordance with a first embodiment.

One of the dampers 6 is shown in more detail in FIG. 2 and will be described below, the description applying in particular to all the dampers. The damper 6 comprises a damper drive 10 by means of which the length of the damper 6 can be varied. Furthermore, a monitoring unit 11 is provided, which, in accordance with a first embodiment, is connected to the damper drive 10, which can be controlled by the monitoring unit 11. To the monitoring unit 11 there are connected a number of sensors 12 which are arranged in the chassis 3 and/or in the superstructure 2 of the vehicle and by means of which the monitoring unit 11 can detect vibrations that occur in the chassis 3. The sensors are, for example, acoustic sensors or acceleration sensors.

If damage occurs in the chassis 3, a characteristic vibration is produced in the chassis 3 which is detected and identified by the monitoring unit 11. For that purpose, different vibration patterns are stored in the monitoring unit 11, which in order to identify the chassis damage, compares the vibrations occurring in the chassis 3 with the vibration patterns.

If chassis damage is recognized, the monitoring unit 11 controls the damper drive 10 in such manner that the damper 6 produces a warning signal S, in particular, in the form of a tactile mechanical vibration by periodically varying its length and transmits the said signal into the superstructure 2 of the vehicle. Thus, the damper constitutes a warning signal generator. FIG. 1 also shows a steering-wheel 13 by means of which the vehicle wheels 4 of a front axle 14 of the vehicle 1 can be steered. The vehicle wheels 4 of the front axle 14 are also called the front wheels. The steering-wheel 13 is part of an electronic steering system 15 which is shown in greater detail in FIG. 3, and which comprises a steering-wheel drive 16 by means of which the steering-wheel 13 can be turned about a steering-wheel axis 17. Furthermore, the monitoring unit 11 or a monitoring unit 11 is provided, which, in accordance with a second embodiment, is connected to the steering-wheel drive 16, which can be controlled by the monitoring unit 11. To the monitoring unit 11 there are connected a number of sensors 12, which are arranged in the chassis 3 and/or in the vehicle superstructure 2 and by means of which the monitoring unit 11 can detect vibrations that occur in the chassis 3.

Figure 3:
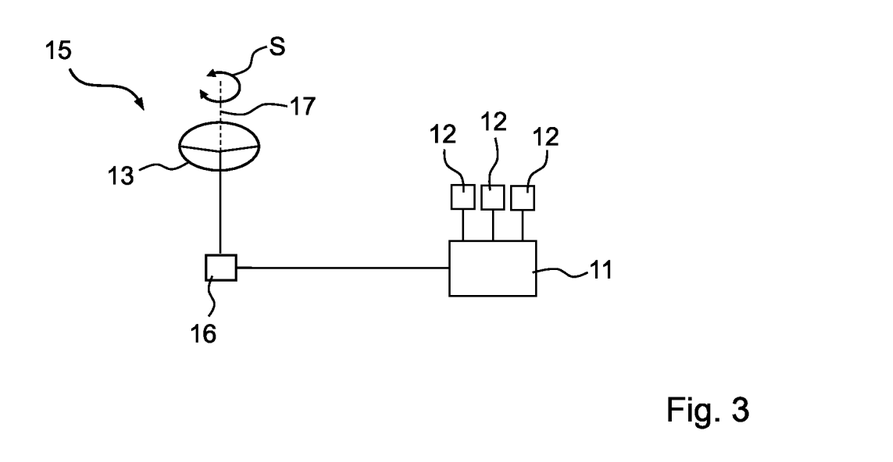
FIG. 3: A schematic view of a steering system of the vehicle, in accordance with a second embodiment.

If damage occurs in the chassis 3, a characteristic vibration is produced in the chassis 3, which is detected and identified by the monitoring unit 11. For that purpose, different vibration patterns for different types of chassis damage are stored in the monitoring unit 11 which, in order to identify the chassis damage, compares them with the vibrations occurring in the chassis 3.

If chassis damage is recognized, the monitoring unit 11 actuates the steering-wheel drive 16 in such manner that in order to produce a warning signal S in the form of, in particular, a tactile mechanical vibration about the steering-wheel axis 17, the steering-wheel 13 is rotated one way and the other periodically. Thus, the steering system 15 constitutes a warning signal generator.

Figure 4:
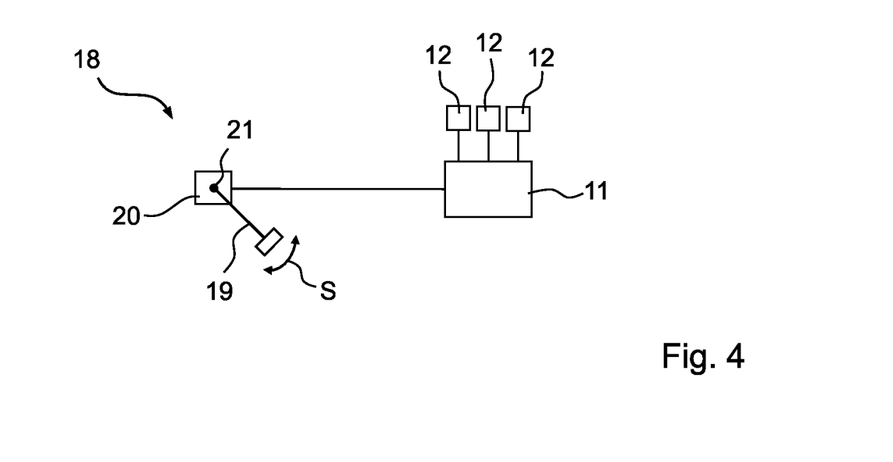
FIG. 4: A schematic view of a foot-pedal arrangement of the vehicle, in accordance with a third embodiment.

FIG. 1 also shows a foot-pedal arrangement 18 with a foot-pedal 19, for example in the form of a brake pedal or an accelerator pedal. FIG. 4 shows a more detailed view of the foot-pedal arrangement 18, which comprises a foot-pedal drive 20 by means of which the foot-pedal 19 can be pivoted about a foot-pedal pivoting axis 21. Furthermore the monitoring unit 11 or a monitoring unit 11 is provided, which, in accordance with a third embodiment, is connected to the foot-pedal drive 20, which can be controlled by the monitoring unit 11. To the monitoring unit 11 there are connected a number of sensors 12, which are arranged in the chassis 3 and/or in the superstructure 2 of the vehicle and by means of which the monitoring unit 11 can detect vibrations occurring in the chassis 3.

If the chassis 3 sustains damage, a characteristic vibration is produced in the chassis 3 and this is detected and identified by the monitoring unit 11. For that purpose, different vibration patterns for different types of chassis damage are stored in the monitoring unit 11 which, in order to identify the chassis damage, compares them with the vibrations occurring in the chassis 3.

If chassis damage is recognized, the monitoring unit 11 actuates the foot-pedal drive 20 in such manner to produce a warning signal S in the form of, in particular, a tactile mechanical vibration, where the foot-pedal 19 pivots to and fro periodically about the foot-pedal pivoting axis 21. Thus, the foot-pedal arrangement 18 constitutes a warning signal generator.

Figure 5:
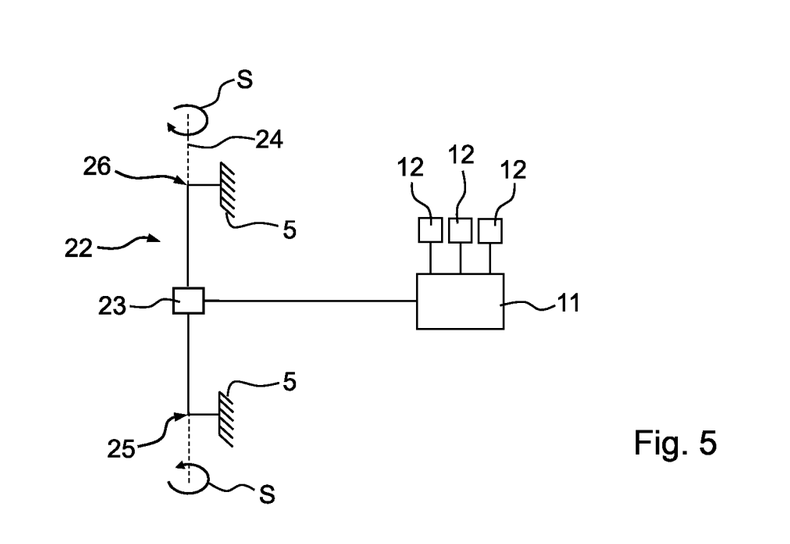
FIG. 5: A schematic view of a roll-stabilizer of the vehicle, in accordance with a fourth embodiment.

Moreover, FIG. 1 also shows a rod-shaped roll-stabilizer 22, which comprises a stabilizer drive 23 and is shown in greater detail in FIG. 5. The roll-stabilizer 22 extends along a stabilizer axis 24 which, in particular, runs in the transverse direction y of the vehicle so that the ends 25 and 26 of the roll-stabilizer 22 are connected to the wheels 4 and/or wheel suspensions 5 of the front axle 14. By means of the stabilizer drive 23 the ends 25 and 26 of the roll-stabilizer 22 can be rotated relative to one another about the stabilizer axis 24. Moreover, the monitoring unit 11 or a monitoring unit 11 is provided, which, in accordance with a fourth embodiment, is connected to the stabilizer drive 23, which can be controlled by means of the monitoring unit 11. Connected to the monitoring unit 11 there are a number of sensors 12 which are arranged in the chassis 3 and/or in the superstructure 2 of the vehicle and by means of which the monitoring unit 11 can detect vibrations occurring in the chassis 3.

If damage occurs in the chassis 3, a characteristic vibration is produced in the chassis 3, which is detected and identified by the monitoring unit 11. For that purpose, for different types of chassis damage different vibration patterns are stored in the monitoring unit 11, which are compared with the vibrations occurring in the chassis in order to identify the chassis damage.

If chassis damage is recognized, the monitoring unit 11 actuates the stabilizer drive 23 in such manner that the ends 24 and 25 of the roll-stabilizer 22 are periodically rotated relative to one another, resulting in a warning signal S in the form, in particular, of a tactile mechanical vibration that is transmitted from the chassis 3 into the vehicle superstructure 2. Thus, the roll-stabilizer constitutes a warning signal generator.

In FIG. 1, furthermore, for each vehicle wheel 4 of a rear axle 28 of the vehicle 1, a rear-axle steering unit 27 can be seen, each rear-axle steering unit 27 comprising a rear-axle steering drive 29 and a track rod 30 by means of which the rear-axle steering drive is connected to the vehicle wheel 4 concerned. The vehicle wheels 4 of the rear axle 28 are also called the rear wheels.

Figure 6:
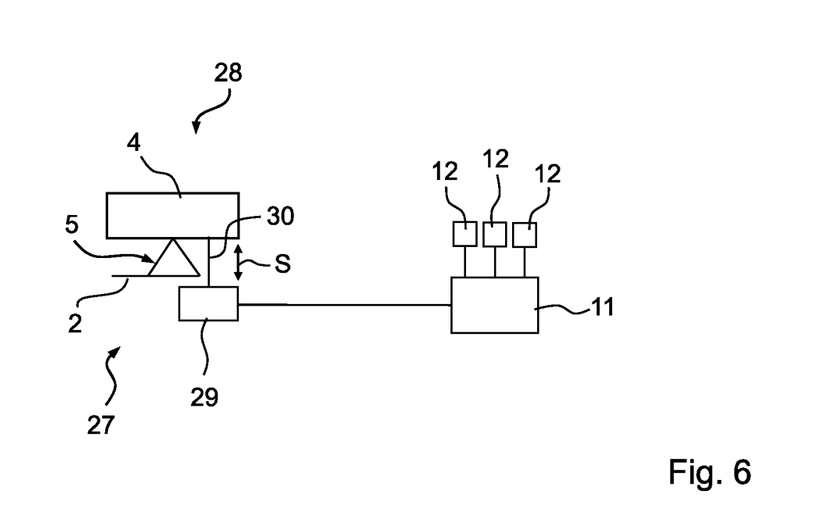
FIG. 6: A schematic view of a rear-axle steering system of the vehicle, in accordance with a fifth embodiment.

For one of the rear wheels 4, the rear-axle steering unit 27 is shown in greater detail in FIG. 6. By means of the rear-axle steering drive 29, by way of the track rod 30, the track or a track angle of the rear wheel 4 can be adjusted. In addition, the monitoring unit 11 or a monitoring unit 11 is provided, which, in accordance with a fifth embodiment, is connected to the rear-axle steering drive 29 which can be controlled by means of the monitoring unit 11. Connected to the monitoring unit 11 there are a number of sensors 12, which are arranged in the chassis 3 and/or in the vehicle superstructure 2 and by means of which the monitoring unit 11 can detect vibrations occurring in the chassis 3.

If damage occurs in the chassis 3, a characteristic vibration is produced in the chassis 3 and this is detected and identified by the monitoring unit 11. For that purpose, for different types of chassis damage, different vibration patterns are stored in the monitoring unit 11, which compares the vibrations occurring in the chassis 3 with the said vibration patterns in order to identify the chassis damage.

If chassis damage is recognized, the monitoring unit 11 actuates the rear-axle steering drive 29 in such manner that the track or a track angle of the rear wheel 4 is periodically adjusted, resulting in a warning signal S in the form, in particular, of a tactile mechanical vibration that is preferably transmitted from the chassis 3 into the vehicle superstructure 2. Thus, the rear-axle steering system 27 constitutes a warning signal generator.

INDEXES

1 Vehicle
2 Vehicle superstructure
3 Chassis
4 Vehicle wheel
5 Wheel suspension
6 Damper
7 Damper
8 Damper
9 Damper
10 Damper drive
11 Monitoring unit
12 Sensor
13 Steering-wheel
14 Front axle
15 Steering system
16 Steering-wheel drive
17 Steering-wheel axis
18 Foot-pedal arrangement
19 Foot-pedal
20 Foot-pedal drive
21 Foot-peal pivoting axis
22 Roll-stabilizer
23 Stabilizer drive
24 Stabilizer axis
25 Stabilizer end
26 Stabilizer end
27 Rear-axle steering system
28 Rear axle
29 Rear-axle steering drive
30 Track rod
L Damper length
S Warning signal
x Longitudinal direction of the vehicle
y Transverse direction of the vehicle
z Vertical direction of the vehicle

The invention claimed is:

1. A method for monitoring a vehicle which comprises a vehicle superstructure, a chassis connected to the vehicle superstructure and a monitoring unit which monitors the chassis for damage, the method comprising:
   detecting chassis damage with the monitoring unit based on vibrations detected in the chassis by sensors arranged in at least one of the chassis and the vehicle superstructure;
   comparing, with the monitoring unit, the vibrations detected in the chassis to different characteristic vibration patterns that are stored in the monitoring unit, the stored different characteristic vibration patterns correspond to different types of chassis damage;
   identifying, with the monitoring unit, the type of chassis damage by associating the vibrations detected in the chassis to one of the different characteristic vibration patterns and an associated type of chassis damage;
   producing a warning signal that corresponds to the type of chassis damage identified with the monitoring unit, the warning signal being produced with a warning signal generator which has at least one drive unit, the at least one drive unit being actuatable to produce the warning signal which is formed as a tactile mechanical vibration; and communicating the warning signal to an operator of the vehicle by transmitting the warning signal from the warning signal generator into the chassis and/or the vehicle superstructure such that the chassis and/or the vehicle superstructure mechanically vibrates.

2. The method according to claim 1, wherein the at least one drive unit is an electro-mechanical actuator.

3. The method according to claim 1, comprising controlling the warning signal generator with the monitoring unit to actuate the drive unit and produce the warning signal based on the type of chassis damage identified, the warning signal generator being controllable to produce different variants of the warning signal which differ from each other in terms of at least one of: a number of signal vibration impulses, a length of the sign vibration impulses; a length of signal pauses between the signal vibration impulses.

4. The method according to claim 1, wherein the warning signal generator comprises at least one active chassis component of the chassis.

5. The method according to claim 4, wherein the at least one active chassis component comprises or is in the form of one or more of an active rear-wheel steering system, and an active roll-stabilizing system.

6. The method according to claim 1, wherein the warning signal generator is formed as at least one active system of the vehicle.

7. The method according to claim 6, wherein the at least one active system comprises one or more of a steer-by-wire system, a brake-by-wire system, a throttle-by-wire system, and a drive-by-wire system.

8. The method according to claim 1, wherein the vehicle comprises at least one active damper which forms the warning signal generator and at least one damper drive unit that forms the at least one drive unit, and the method further comprising:
    actuating the at least one damper drive unit to adjust a length of the at least one active damper in order to produce the warning signal as length variations of the at least one damper; and
    transmitting the warning signal from the at least one active damper into the vehicle superstructure and/or into the chassis.

9. The method according to claim 1, wherein the vehicle comprises a steering system equipped with a steering-wheel, which forms the warning signal generator and comprises at least one steering-wheel drive unit that forms the at least one drive unit, the method further comprising:
    actuating the steering-wheel drive unit to produce the warning signal as rotational movements of the steering-wheel about a steering wheel axis.

10. The method according to claim 1, wherein the vehicle comprises at least one foot-pedal arrangement equipped with a foot-pedal, which forms the at least one warning signal generator, and at least one foot-pedal drive unit that forms the at least one drive unit, the method further comprising:
    actuating the at least one foot-pedal drive unit to produce the warning signal as pivoting movements of the foot-pedal about a foot-pedal pivoting axis.

11. The method according to claim 1, wherein the vehicle comprises at least one brake system equipped with at least one brake, which forms the at least one warning signal generator, and at least one brake drive unit that forms the at least one drive unit, the method further comprising:
    actuating, by the at least one brake drive unit, the at least one brake as a function of the warning signal to produce intermittent and/or periodic braked decelerations of the vehicle.

12. The method according to claim 1, comprising:
    producing, by means of the monitoring unit, an acoustic and/or a visual warning message.

13. A method for monitoring a vehicle which comprises a vehicle superstructure, a chassis connected to the vehicle superstructure and a monitoring unit which monitors the chassis for damage, the method comprising:
    detecting chassis damage with the monitoring unit based on vibrations detected in the chassis by sensors arranged in at least one of the chassis and the vehicle superstructure; and
    producing a warning signal with a warning signal generator which has at least one drive unit, the at least one drive unit being actuatable to produce the warning signal which is formed as a tactile mechanical vibration; and
    transmitting the warning signal from the warning signal generator into the chassis and/or the vehicle superstructure such that the chassis and/or the vehicle superstructure mechanically vibrates; and
    wherein the vehicle comprises a vehicle drive unit which forms the warning signal generator, and at least one vehicle motor that forms the at least one drive unit, the method further including controlling the at least one vehicle drive motor as a function of the warning signal to produce intermittent and/or periodic accelerations of the vehicle.

* * * * *